US009136937B1

(12) United States Patent
Cheng et al.

(10) Patent No.: US 9,136,937 B1
(45) Date of Patent: Sep. 15, 2015

(54) SYSTEM AND METHOD FOR PROVIDING ANTENNA DIVERSITY IN MULTIPLE SUB-CARRIER COMMUNICATION SYSTEMS

(75) Inventors: Hao-Ren Cheng, Miaoli County (TW); William J. McFarland, Los Altos, CA (US)

(73) Assignee: Qualcomm Incorporated, San Diego, CA (US)

( * ) Notice: Subject to any disclaimer, the term of this patent is extended or adjusted under 35 U.S.C. 154(b) by 680 days.

(21) Appl. No.: 12/706,141

(22) Filed: Feb. 16, 2010

(51) Int. Cl.
| H03K 9/00 | (2006.01) |
| H03D 3/00 | (2006.01) |
| H04B 1/44 | (2006.01) |
| H04B 7/185 | (2006.01) |
| H04B 7/06 | (2006.01) |
| H04B 7/08 | (2006.01) |

(52) U.S. Cl.
CPC .......... *H04B 7/18545* (2013.01); *H04B 7/0602* (2013.01); *H04B 7/0802* (2013.01); *H04B 7/0805* (2013.01); *H04B 7/1855* (2013.01)

(58) Field of Classification Search
USPC ......... 375/219, 295, 316, 328, 346, 351, 220, 375/222, 240.26–240.28, 254, 259, 285, 375/284, 278, 299, 307, 324, 339, 340, 348, 375/354; 455/3.01, 3.04, 428, 403, 13.3, 7, 455/39, 63.3, 73, 78, 83, 560
See application file for complete search history.

(56) References Cited

U.S. PATENT DOCUMENTS

| 7,305,056 | B2 * | 12/2007 | Kroeger | 375/348 |
| 7,636,593 | B2 * | 12/2009 | Kurioka | 455/575.7 |
| 8,755,476 | B2 * | 6/2014 | Li et al. | 375/347 |
| 2004/0229650 | A1 * | 11/2004 | Fitton et al. | 455/561 |
| 2005/0107045 | A1 * | 5/2005 | Kroeger | 455/83 |
| 2005/0245224 | A1 * | 11/2005 | Kurioka | 455/272 |
| 2005/0254608 | A1 * | 11/2005 | Lee et al. | 375/347 |
| 2007/0230604 | A1 * | 10/2007 | Nakamura | 375/260 |
| 2008/0051046 | A1 * | 2/2008 | Ruckriem | 455/132 |
| 2008/0139153 | A1 * | 6/2008 | Tuo et al. | 455/277.2 |
| 2010/0091904 | A1 * | 4/2010 | Wang et al. | 375/296 |
| 2010/0183099 | A1 * | 7/2010 | Toda et al. | 375/340 |
| 2010/0195754 | A1 * | 8/2010 | Li et al. | 375/267 |

FOREIGN PATENT DOCUMENTS

WO   WO 2008133298 A1 * 11/2008

* cited by examiner

*Primary Examiner* — Linda Wong
(74) *Attorney, Agent, or Firm* — Bay Area Technology Law Group PC (57) ABSTRACT

A system and method to provide antenna diversity by switching between antenna feeds to optimize signal quality. Antenna conditions are determined during an OFDM guard interval to minimize disruption of symbol transmission. When the signal quality assessment determines that an improved signal is available on an alternative antenna, an antenna change is performed to switch to the alternative antenna, also during a GI, again minimizing disruption in information transmission. Preferably, the process is continually applied, so that antenna conditions are monitored for changing conditions and the antenna experiencing the best signal is selected.

22 Claims, 6 Drawing Sheets

SYSTEM AND METHOD FOR PROVIDING ANTENNA DIVERSITY IN MULTIPLE SUB-CARRIER COMMUNICATION SYSTEMS

FIELD OF THE PRESENT INVENTION

The present invention relates to improving signal quality in mobile digital communication systems in general and more specifically to methods and systems for providing antenna diversity in mobile, wireless OFDM systems.

BACKGROUND OF THE INVENTION

Advanced multimedia services continue to drive requirements for increasing data rates and higher performance in wireless systems. Current technologies for high performance communication systems, such as those specified by the Japanese integrated services digital broadcasting terrestrial standard (ISDB-T), employ communication methods based on Orthogonal Frequency Division Multiplexing (OFDM).

As known to those of skill in the art, multipath interference presents a significant impediment to effective wireless communication. Since a clear line-of-sight rarely exists between a transmitter and receiver, a signal typically gets reflected by buildings and other various obstacles. As a result, multiple versions of the signal travel along different paths before arriving at the receiver. Each path is subject to different conditions which can introduce phase shifts, time delays, attenuations, and other distortions that can destructively interfere with one another at the receiver. For example, the variable transmission delays can result in inter-symbol interference (ISI) when the different data signals arrive at the receiver simultaneously In OFDM multiple sub-carrier systems, a higher rate data signal is divided among multiple narrowband sub-carriers that are orthogonal to one another in the frequency domain. Thus, the higher rate data signal is transmitted as a set of parallel lower rate data signals carried on separate sub-carriers A received OFDM symbol in an OFDM system generally consists of both data and pilot synchronization information transmitted on the multiple sub-carriers multiplexed together and spanning multiple sample periods. Modulation and demodulation in an OFDM system uses an inverse fast Fourier transform (IFFT) at the transmitter and a fast Fourier transform (FFT) at the receiver. At the transmitter, a cyclic prefix of a section of the IFFT output for each OFDM symbol is typically appended to the beginning of the OFDM symbol as a guard interval (GI). The length of the OFDM symbol before adding the guard interval is known as the useful symbol period duration At the receiver, the cyclic prefix is removed prior to the FFT demodulation by the appropriate positioning of an FFT window, with size equal to the useful symbol period duration, along a received sample sequence. The FFT demodulation transforms the window of received time domain samples, in the received sample sequence, to a frequency domain (OFDM) symbol.

A principle advantage of this type of communication system is that the lower data rate occupies a longer symbol period than in a higher rate single carrier system. The addition of the guard interval to each lower frequency symbol contains the dispersion caused by multipath within the longer symbol period, reducing ISI OFDM systems also offer a number of other advantages relevant to wireless applications, including high spectral efficiency and the ability to compensate for poor channel conditions, including signal fade.

A significant aspect of OFDM systems is the use of channel estimating techniques to correct for changes in the sub-carrier characteristics In pilot-based systems, a known symbol, or "pilot," is transmitted at given sub-carrier frequencies and at given times. Since the receiver knows the transmitted symbol, any errors to the transmitted pilot due to sub-carrier conditions can be estimated and an appropriate correction calculated. Channel conditions for all sub-carriers and times can likewise be interpolated from the pilot information, allowing equalization of the signal and subsequent coherent demodulation Further details regarding the design of OFDM systems can be found in co-pending, commonly-assigned U.S. patent application Ser. No. 12/272,629, filed Nov. 17, 2008, Ser. No. 12/277,247, filed Nov. 24, 2008, Ser. No. 12/277,258, filed Nov. 24, 2008, Ser. No. 12/365,726, filed Feb. 4, 2009, and Ser. No. 12/398,952, filed Mar. 5, 2009, all of which are hereby incorporated by reference in their entirety Antenna diversity is a well recognized technique that generally employs two or more antennas to provide improved quality and reliability by reducing multipath interference. The multiple antennas give the receiver different observations of the same signal, each of which are subject to different conditions. Accordingly, even if one antenna is suffering from poor reception, an alternate antenna may still have good signal quality.

One class of existing diversity reception technologies includes systems that combine the signals received from each antenna. An example of this technique involves daisy-chaining receivers so that a multiple receivers associated with each antenna combines the signal with the others in series A more sophisticated system uses maximum ratio combining (MRC) to selectively weight and add the signals coherently to provide better results than simple addition Such methods are widely used in mobile and portable digital TV receivers However, any system that relies on combining signals must have duplicate a significant portion of the signal processing architecture for each antenna, depending upon the stage at which the signals are combined. Accordingly, such techniques offer good performance but at a substantial cost, typically almost a multiple equivalent to the number of antennas employed compared to a single antenna system.

Another strategy for diversity reception relies on switching between antennas based upon the quality of the signal being received. This technique offers appreciable cost savings but represents implementation and performance challenges, primarily due to loss of data and channel information during the switching process.

Thus, it would be desirable to provide a system and method of antenna diversity using antenna selection that offers increased performance. In particular, it would be desirable to provide antenna switching while minimizing disruption of data reception or channel estimation.

SUMMARY OF THE INVENTION

In accordance with the above needs and those that will be mentioned and will become apparent below, this disclosure is directed to a method for providing antenna diversity in a multiple sub-carrier digital communication receiver comprising the steps of providing a first antenna and a second antenna, wherein the first antenna is delivering a signal feed to the receiver and switching the signal feed being delivered to the receiver from the first antenna to the second antenna during a first guard interval In one embodiment, the feed is alternated between the first antenna and second antenna during subsequent guard intervals.

One aspect of the disclosure involves the steps of determining a metric of the first antenna, determining a metric of the second antenna upon switching the signal feed being delivered to the receiver from the first antenna to the second antenna during the first guard interval, and selecting between the fast antenna and the second antenna on the basis of the determined metrics Several suitable sequences of coordination between switching and measuring can be employed In one embodiment, the step of selecting between the first antenna and the second antenna comprises leaving the signal feed switched to the second antenna for a period of at least one symbol when the metric of the second antenna is preferred to the metric of the first antenna. In another embodiment, the step of selecting between the first antenna and the second antenna comprises switching the signal feed during a guard interval back to the first antenna from the second antenna when the metric of the first antenna is preferred to the metric of the second antenna. Further, the signal feed can be switched back to the first antenna during the first guard interval.

In a currently preferred embodiment, the step of determining the metric of the second antenna comprises switching the signal feed being delivered to the receiver from the first antenna to the second antenna and then back to the first antenna during a first guard interval and wherein the step of selecting between the first antenna and the second antenna on the basis of the determined metrics comprises switching the signal feed from the first antenna to the second antenna at a subsequent guard interval when the metric of the second antenna is preferred to the metric of the first antenna.

In the noted embodiments, any suitable antenna metric can be used to assess signal quality. For example, the steps of determining antenna metrics can comprise measuring at least one signal quality metric selected from the group comprising power output, interference power in an adjacent channel, received signal, and flatness of received channel A currently preferred embodiment uses power output for the signal quality metric.

In another aspect of the disclosure, the methods further comprise the step of modifying a pre-FFT process when the signal feed being delivered to the receiver is switched from the first antenna to the second antenna during the first guard interval. In one embodiment, the method includes modifying a pre-FFT process when the signal feed being delivered to the receiver is switched from the first antenna to the second antenna during the first guard interval and modifying a pre-FFT process and a post-FFT process when the signal feed being delivered to the receiver is switched from the first antenna to the second antenna during the subsequent guard interval Yet another aspect involves estimating a Doppler frequency associated with the signal feed and waiting until the Doppler frequency is below a threshold before determining the metric of the second antenna.

This disclosure is also directed to an apparatus in a multiple sub-carrier digital communication receiver comprising a first antenna and a second antenna, wherein the first antenna is delivering a signal feed to the receiver and a switching module configured to switch the signal feed being delivered to the receiver from the first antenna to the second antenna during a first guard interval In one embodiment, the switching module is further configured to alternate between the first antenna and second antenna during subsequent guard intervals.

According to the disclosure, the apparatus can further include an antenna metric module configured to determine a metric of the first antenna and to determine a metric of the second antenna after the signal feed being delivered to the receiver from the first antenna is switched to the second antenna during the first guard interval. In such embodiment, the switching module is further configured to select between the first antenna and the second antenna on the basis of the determined metrics.

In one embodiment, the switching module is configured to select between the first antenna and the second antenna by leaving the signal feed switched to the second antenna for a period of at least one symbol when the metric of the second antenna is preferred to the metric of the first antenna. In another, the switching module is configured to select between the first antenna and the second antenna by switching the signal feed during a guard interval back to the first antenna from the second antenna when the metric of the first antenna is preferred to the metric of the second antenna. Further, the signal feed can be switched back to the first antenna during the first guard interval.

In a currently preferred embodiment, the antenna metric module is configured to determine the metric of the second antenna when the signal feed being delivered to the receiver is switched from the first antenna to the second antenna and then back to the first antenna during a first guard interval and wherein the switching module is configured to select between the first antenna and the second antenna by switching the signal feed from the first antenna to the second antenna at a subsequent guard interval when the metric of the second antenna is preferred to the metric of the first antenna.

Preferably, the antenna metric module is configured to measure at least one signal quality metric selected from the group comprising power output, interference power in an adjacent channel, received signal, and flatness of received channel. For example, power output can be used to determine signal quality Another aspect of the disclosure involves a pre-FFT process module that is configured to modify a pre-FFT process when the signal feed being delivered to the receiver is switched from the first antenna to the second antenna during the first guard interval. Further, in some embodiments the apparatus also includes a post-FFT process module, wherein the pre-FFT process module is configured to modify a pre-FFT process when the signal feed being delivered to the receiver is switched from the first antenna to the second antenna during the first guard interval and wherein the pre-FFT process module is configured to modify a pre-FFT process and the post-FFT module is configured to modify a post-FFT process when the signal feed being delivered to the receiver is switched from the first antenna to the second antenna during the subsequent guard interval In yet another aspect, the apparatus also includes a Doppler estimation module, wherein the antenna metric module is configured to wait until the Doppler frequency is below a threshold before determining the metric of the second antenna

BRIEF DESCRIPTION OF THE DRAWINGS

Further features and advantages will become apparent from the following and mole particular description of the preferred embodiments of the invention, as illustrated in the accompanying drawing, and in which like referenced characters generally refer to the same parts or elements throughout the views, and in which.

DETAILED DESCRIPTION OF THE INVENTION

This disclosure is directed to systems and methods that provide antenna diversity by switching between antenna feeds to improve available signal quality. The techniques exploit the OFDM guard interval to perform an antenna test and quickly assess the signal quality on an alternative antenna. By performing the signal sampling during the GI, disruption of symbol transmission is minimized. When the signal quality assessment determines that an improved signal is available on the alternative antenna, an antenna change is performed to switch to the alternative antenna, also during a GI, again minimizing disruption in information transmission. As desired, the antenna change can occur during the first GI after the antenna test is performed or during a subsequent GI. Preferably, the process is continually applied, so that antenna conditions are monitored for changing conditions and the antenna experiencing the best signal is selected. In some embodiments, the antenna switch is performed "blind," without determining the signal quality of the alternate antenna Preferably, such blind switches follow a predefined pattern configured to maximize performance, particularly when signal quality is poor.

At the outset, it is to be understood that this disclosure is not limited to particularly exemplified materials, architectures, routines, methods or structures as such may, of course, vary. Thus, although a number of such option, similar or equivalent to those described herein, can be used in the practice of embodiments of this disclosure, the preferred materials and methods are described herein.

It is also to be understood that the terminology used herein is for the purpose of describing particular embodiments of this disclosure only and is not intended to be limiting.

Unless defined otherwise, all technical and scientific terms used herein have the same meaning as commonly understood by one having ordinary skill in the art to which the disclosure pertains.

As used herein, the term "antenna test" refers to a temporary switch from one antenna to another for a period less than the GI of an OFDM symbol.

As used herein, the term "antenna change" refers to a switch from one antenna to another for a period of at least one OFDM symbol, wherein the switch occurs during the GI of the OFDM symbol.

Further, all publications, patents and patent applications cited herein, whether supra or infra, are hereby incorporated by reference in their entirety.

Finally, as used in this specification and the appended claims, the singular forms "a, "an" and "the" include plural referents unless the content clearly dictates otherwise As will be appreciated by one of skill in the art, implementing a wireless communication system for mobile applications requires that the system be capable of handling a wide variety of challenging characteristics. For example, relative motion between the transmitter and receiver causes shifts in the frequency of a transmitted signal due to the Doppler effect. Further, a mobile receiver experiences varying signal reception conditions as the environment around the receiver changes, particularly with regard to buildings or geographical features such as hills or valleys Although challenging in their own right, these characteristics can also combine in a number of ways to create increased difficulties.

For example, it has been found that conventional wireless systems have reduced effectiveness in low Doppler environments when coupled with poor signal quality. The performance of a receiver on train illustrates these conditions When the train is underway, the relative speed of the receiver is high and it is less likely to experience reduced signal quality for extended periods as the environment around the receiver is rapidly changing. Further, when signal strength is good, the receiver can compensate for Doppler interference resulting from changing receiver velocity more effectively However, it has been observed that OFDM systems, such as ISDB, exhibit poor performance when accelerating or decelerating at lower speeds, such as those experienced when a train arrives or departs from a station. Even though the overall Doppler effect is relatively low due to the reduced speed of the receiver, the combination of weak signal strength due to the presence of neighboring shadowing buildings and the varying Doppler effect due to the changing speed of the receiver relative to the transmitter degrades the receiver's performance. The relatively low velocity of the receiver compounds the problem because the receiver remains subjected to the environment causing the reduced signal quality for extended periods of time. When poor signal quality persists for too long a period, conventional strategies such as time interleaving fail to compensate.

Figure 1:
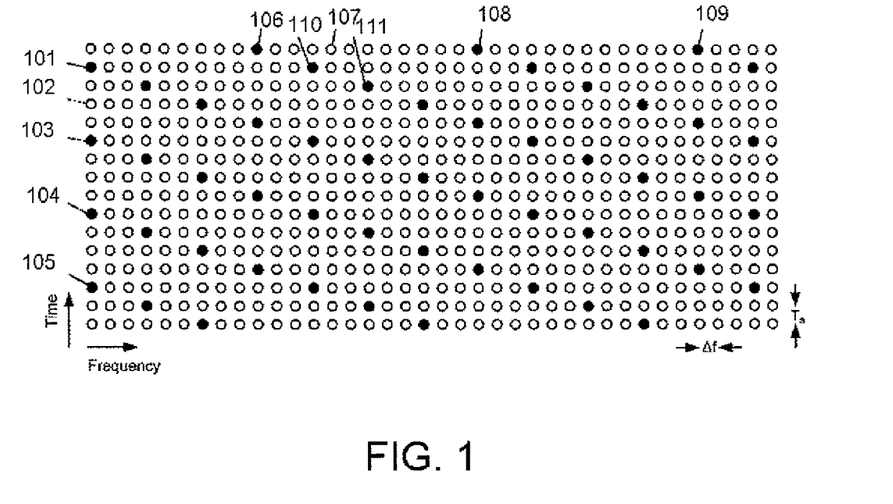
FIG. 1 illustrates a portion of the frame structure of an OFDM system using scattered pilots.

This disclosure is directed to systems that help improve the performance of a wireless receiver in such conditions by providing antenna diversity. As discussed above, the use of multiple antennas can compensate for poor signal quality because the different antennas will be subject to different receiving conditions and one will be more likely to have sufficient reception. To avoid the cost overhead associated with signal combining diversity reception techniques, the disclosed systems employ a switching algorithm that selects the feed from one of a plurality of antennas on the basis of signal quality. Further, these systems and methods compensate for the discontinuous signal that occurs when switching from one antenna to another As discussed above, wireless communication systems must cope with channel conditions that can vary significantly over relatively short time periods. Coherent demodulation OFDM systems employ channel estimation techniques to equalize the received signal and help compensate for interference from a variety of sources, including multipath and Doppler. FIG. 1 shows a portion of an exemplary flame structure of an OFDM system, such as DVB-T/H or ISDB-T As can be seen, a plurality of OFDM symbols in time (represented on the vertical axis) consist of a plurality of values at different sub-channel frequencies (represented on the horizontal axis) Generally, the OFDM symbols are spaced apart by a period $T_s$ equal to the sum of the useful signal period, $T_u$ and the guard interval, $T_g$. In this figure, the open dots, such as 102, represent the data sub-channels and the solid dots, such as 101, represent pilot sub-channels This implementation is a scattered pilot system because the frequency at which the pilots are located at a given time varies. As will be appreciated, the techniques disclosed herein can be adapted to continuous pilot systems in which specific frequencies are dedicated to the transmission of pilot symbols Since the pilots comprise a known pattern of symbols, they provide the receiver with a means to accurately determine channel conditions. By dividing the received pilot symbols with the known pilot symbols, a transfer function H(f,t) is estimated for each pilot cell. These estimates can then be used to interpolate in time and frequency between the pilots to determine equalization for the data channels. The example illustrated represents a 1/12 interpolation scheme as the pilots are spaced every 12-th carrier. In such a system, the pilots shift by three sub-channels for each OFDM symbol, resulting in a four symbol repetition period.

Generally, interpolation occurs along one or two dimensions. One dimensional interpolation includes interpolation in time, such as using channel estimates derived from pilots at sub-channels 101 and 103 to determine a channel estimate for the data at sub-channel 102, and interpolation in frequency, such as using channel estimates derived from pilots at sub-channels 106 and 108 to determine a channel estimate for the data at sub-channel 107. Correspondingly, two dimensional interpolation involves interpolating in both time and frequency, such as using channel estimates derived from pilots at sub-channels 106, 108, 110 and 111 to determine a channel estimate for data in adjacent cell 107 Preferably, improved estimation is obtained by using a number of adjacent pilots, such as all pilots within a grid defined by three to four preceding and succeeding OFDM symbols and within about 18 sub-carriers, or less than about one and a half of the pilot inclusion frequency Typically, a Wiener filter is used to interpolate the data sub-carriers from the transfer function determined from the pilot sub-carriers using the following equation:

$$\hat{H}_{m,k} = \sum_{m'} \sum_{k'} \alpha_{m',k'} \cdot h_{m',k'} \quad (1)$$

As indicated by the equation, the interpolated channel estimate $\hat{H}_{m,k}$ is equal to the sum over m' and k', of the product of received channel estimate $h_{m',k'}$ and the Wiener coefficient $\alpha_{m',k'}$, where m is the OFDM symbol and k is the sub-carrier index. One suitable routine for calculating the Wiener coefficient minimizes the mean square error (MSE) Since the transfer function is continuous, an interruption in the signal caused by switching antenna feeds will interfere with the channel estimation determination. Suitable techniques to compensate for this discontinuity are discussed below.

Figure 2:
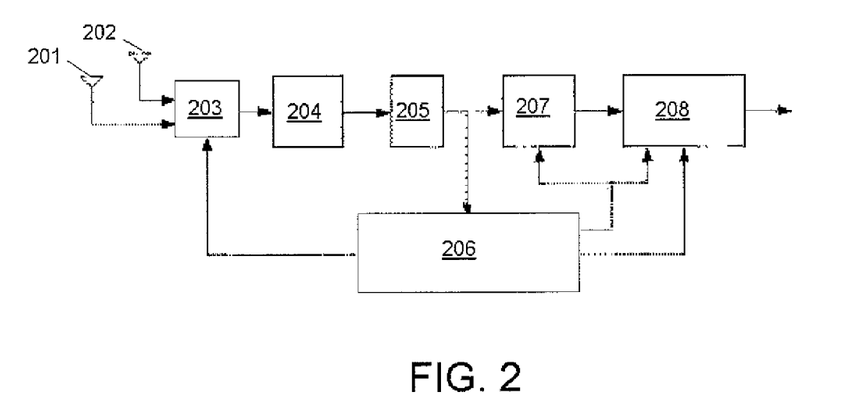
FIG. 2 is a schematic illustration of select functional elements of an antenna diversity system, according to the invention.

Turning now to FIG. 2, an implementation of an antenna diversity system 200 configured for a one segment ISDB-T is schematically illustrated. As shown, a first antenna 201 and second antenna 202 feed into switch 203, which delivers one of the feeds to block 204 for RF amplification and analog to digital conversion. The resulting 8× MHz signal is fed into a 2:1 adjacent channel interference (ACI) filter 205, resulting in a 4× MHz output. The output from ACI filter 205 is analyzed to assess signal strength in block 206 as will be discussed below. The results of the signal strength assessment are used to drive switch 202 to select between antennas 201 and 202

Alternatively, any other suitable metric for assessing signal strength can be used For example, any measure reflecting the strength of the desired signal or the signal strength of interfering signals, the flatness of the channel response for the desired signal, and the error vector magnitude (EVM) of the received signal can all be used to gauge signal quality.

Figure 3:
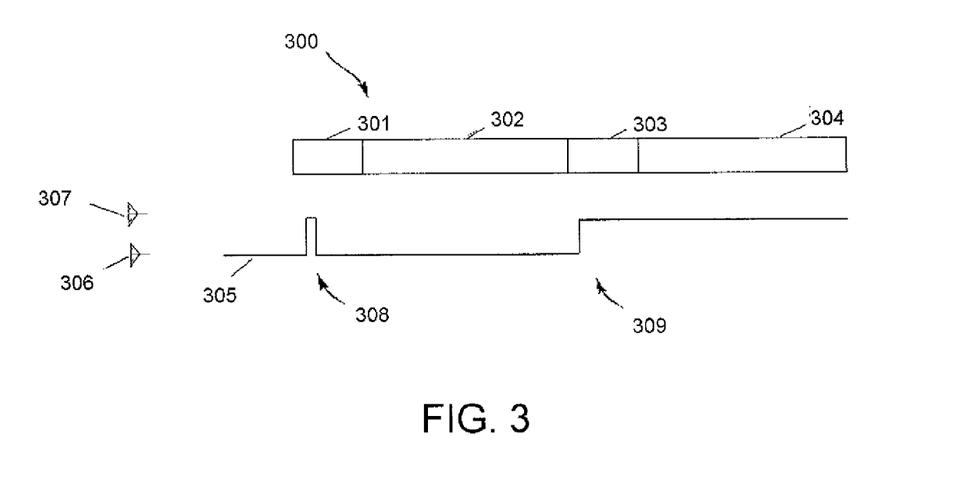
FIG. 3 is a graphic illustration showing switching between two antennas relative to OFDM symbols having guard intervals, according to the invention.

As shown schematically in FIG. 3, a time domain representation of a signal 300 having a sequence of OFDM symbols, comprising a series of GIs 301 and 303 appended to useful signal period 302 and 304 of the OFDM symbols. Although the illustrated sequence indicates the OFDM symbols are adjacent, in practice they may be separated by a plurality of intervening OFDM symbols. Plot 305 graphically illustrates the feed from a first antenna 306 and a second antenna 307. As can be seen, plot 305 indicates that the feed is briefly switched for a period 308 from antenna 306 to antenna 307 during a first GI 301 for an antenna test. Period 308 is long enough to allow the determination of signal strength, in conjunction with block 206, but shorter than the GI. For systems employing the ISDB-T protocol, the GI is typically 126 μs. Accordingly, in this embodiment, period 308 is preferably in the range of approximately 10 to 20 μs. If the signal quality of antenna 307, determined during period 308, is greater than that from antenna 306, the feed is switched to antenna 307 during a subsequent GI 303, causing an antenna change as shown at point 309 for a period that persists for at least the OFDM symbol succeeding the antenna change.

In this embodiment, the second antenna is quickly assessed during a first GI and the switch from the first antenna to the second antenna, providing the second antenna exhibits improved signal quality, occurs during a subsequent GI However, a number of other suitable sequences of testing signal quality and antenna switching can be employed. For example, when the antenna feed is initially switched to determine the quality of the second antenna, it can simply be left switched to the second antenna if the signal quality of the second antenna is superior to that of the first antenna. Alternatively, the antenna feed can be switched during a first GI and the feed can be left at the second antenna for a period of at least one symbol while the signal quality is assessed. After the period of at least one symbol, the feed can be switched back to the first antenna during a subsequent GI if dictated by the comparison of respective signal qualities. In yet another example, the test can be performed by switching to the second antenna and back during the first GI and then, if warranted, the feed can be switched to second antenna during the same GI One of skill in the art will recognize that these and other sequences fall within the boundaries of this disclosure.

Returning to FIG. 2, block 206 calculates the received signal power so that a comparison between antenna 201 and 202 can be made. If the alternate antenna is determined to have better signal quality, switch 203 selects the corresponding feed at a subsequent guard interval. Output from block 206 sends a gating signal to block 207 so that the pre- and post-FFT processes affected by the discontinuity of the signal can compensate accordingly, as discussed below. Further, block 206 signals channel estimator 208 so that it can accommodate the discontinuous signal, also discussed below. Output from channel estimator is then fed to forward error correction (FEC) and additional conventional processes.

Preferably, relative antenna signal quality is determined simply by comparing the signal power output at 4× MHz from ACI filter 205 between the current and any alternate antennas Also preferably, the signal power output from ACI filter 205 is calculated on the basis of the delay introduced by filters and implementation latency. For example, an analog baseband filter introduces delays of 2.6, 3.2, 3.8 and 4.4 μs for the second, third, fourth and fifth-order Butterworth filters, respectively Alternatively, the criteria for antenna selection can rely on calculation of the 430 kHz in-band power and analysis of its frequency response. As will be recognized, this method represents higher in-band power and a flatter frequency response and can provide better performance, but is more difficult to implement due to the relatively low number of signal samples.

In other embodiments, signal quality is assessed by determining the EVM of the demodulated antenna output and comparing it to an ideal received signal that would produce the same demodulated output. The comparison can be performed either before or after the demodulated data is subjected to error correction. As will be appreciated, running error correction on the signal imparts a delay in the determination of signal quality, but provides a more accurate representation of the antenna's quality. On the other hand, performing the comparison on the demodulated data before error correction minimizes the latency caused by making the determination, but yields a less accurate assessment of the antenna's signal quality. One of skill in the art can readily chose between these implementations to meet the design goals of the particular application.

A further aspect of the disclosure includes the use of a combination of the noted antenna quality factors that have been discussed to optimize antenna selection. For example, a combination of factors including the strength of the desired signal, the signal strength of interfering signals, the flatness of the channel response for the desired signal, the received signal quality, (e.g., EVM), and other suitable signal quality metrics can be used as desired. Preferably, such a combination would assign appropriate weights to the relevant factors depending upon the intended application and desired performance profile.

As discussed above, switching between antennas creates a discontinuity in the received signal that is manifest in two primary ways First, the temporary antenna switch associated with the antenna test indicated by period 308 constrains the disruption to the guard interval. Accordingly, this effects pre-FFT signal processes, including direct current (DC) offset compensation, in-phase (I) and quadrature (Q) mismatch compensation and frequency offset tracking. Since the guard interval is removed during the FFT process, the temporary antenna switch does not significantly affect the post-FFT signal processes. Second, the switch to the antenna determined to have improved signal quality associated with an antenna change as indicated by point 309 effects both pre-FFT signal processes and post-FFT processes that depend upon continuity across a sequence of OFDM symbols, including channel estimation and channel impulse response estimation.

Preferably, the effect of the discontinuous signal on pre-FFT processes is compensated for by providing a gating signal from block 206 to block 207. Generally, the frequency offset tracking process is the most sensitive to signal disruption. When block 207 receives a gating signal from block 206 indicating an antenna switch, block 207 discards the estimation results produced by the frequency offset tracking process. Also preferably, the switching rate of the antenna test can be adjusted to minimize the effects of the discontinuities. For example, in one embodiment, the switching routine to assess antenna signal strength occurs every four OFDM symbols. Depending upon the application and the desired performance, other switching rates, such as every ten OFDM symbols or more, are suitable.

As referenced above, the signal discontinuity caused when switching from one antenna to another also affects post-FFT processes. The effects on channel estimation and channel impulse response estimation are preferably compensated by employing a more stringent interpolation filter, such as a 1:12 interpolation filter, to limit the interpolation to pilots within the current OFDM symbol.

Fox example, an operation parameter for a less stringent, two dimensional filter, interpolating in time and frequency directions, is that the echo delays are less than $T_u/3$ and Doppler spectrum as wide as $1/[4(T_u+T_g)]$ or less. On the other hand, a one dimensional filter interpolating in frequency only requires echo delays less than $I_u/12$ and Doppler spectrum as wide as $1/(I_u+I_g)$. Accordingly, the two dimensional filter can be designed with a lower bandwidth to filter out more thermal noise. In turn, the two dimensional filter channel estimation can provide improved performance as compared to the one dimensional filter channel estimation. An example of the typical improvement in signal-to-noise ratio is approximately 2 dB.

Thus, the more stringent filter results in some loss of signal. Further, the use of a 1:12 interpolation filter is generally limited to situations where the delay spread is within approximately 60 μs. Accordingly, to minimize the performance limitations associated with the use of the more stringent filter, preferred embodiments of the system use the gating signal from block 206 to control channel estimation block 208, causing it to alternate between interpolation filters depending upon whether an antenna switch has occurred. Generally, the use of the more limiting filter will allow the channel impulse response estimation to accommodate the brief disruption associated with an antenna switch.

Another approach to handling the interpolation in time of the filter involves storing one channel estimate for each receive antenna. When a switch is made, the new channel estimate can be interpolated in time with the previous channel estimation for that antenna. This allows the channel estimate for a given antenna to be updated each time it is used, thus keeping the estimate current and allowing time interpolation. Similarly, this approach does not corrupt the interpolation by averaging the channel estimate from two different antennas together.

As discussed above, the expected performance gains associated with employing these antenna diversity techniques occur at relatively low Doppler frequencies Accordingly, preferred embodiments use the output of the Doppler estimation routines to generate a gating signal that determines whether or not to implement the antenna test and antenna change aspects of the antenna diversity process.

Figure 4:
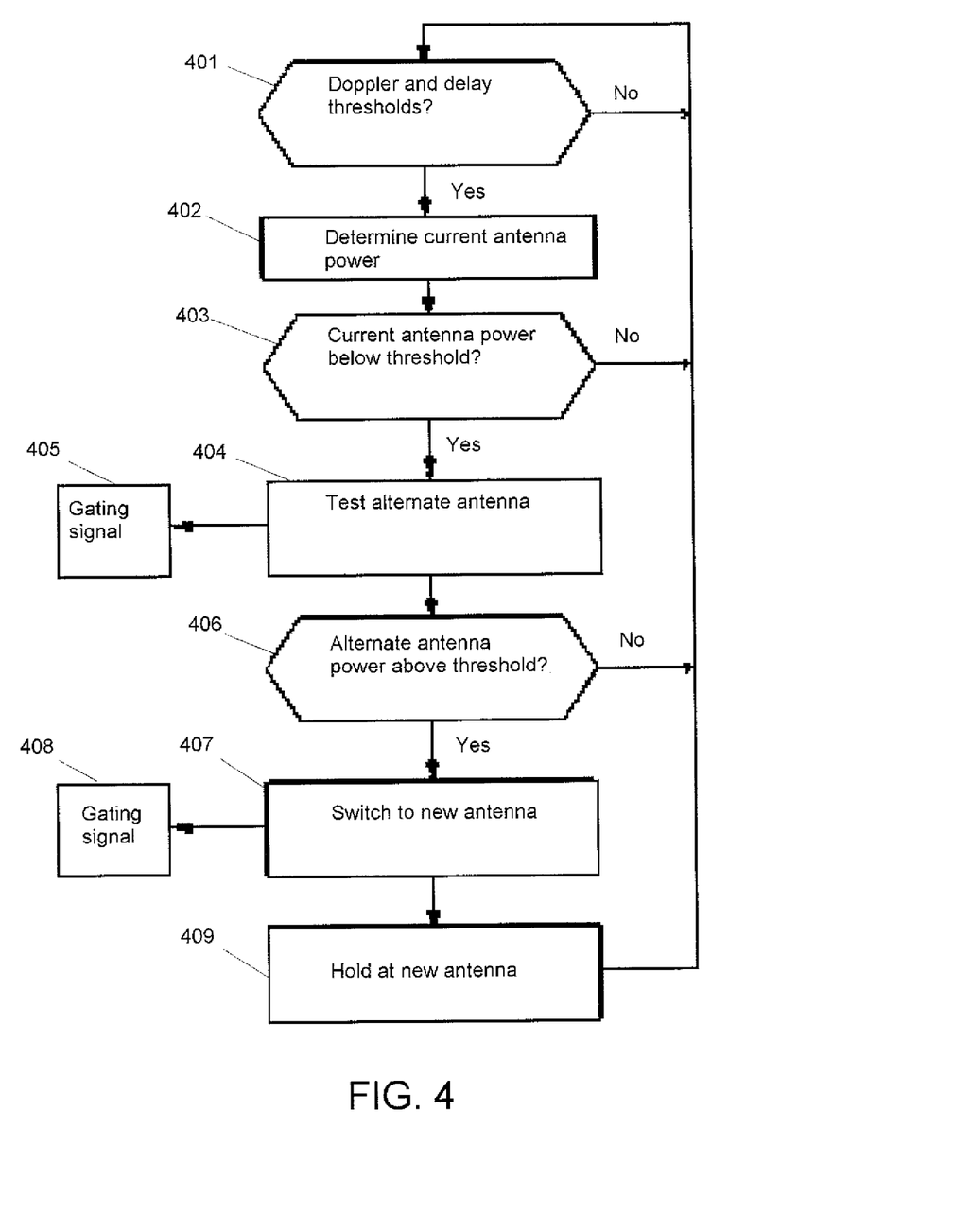
FIG. 4 is a flow chart representing an embodiment of the antenna diversity system, according to the invention.

FIG. 4 is a flow chart illustrating a suitable algorithm associated with the antenna diversity techniques discussed above. Block 401 determines whether the appropriate thresholds are met to implement the antenna diversity routine. As discussed above, in one embodiment, the techniques provide a performance gain at delay spreads below approximately 60 μs. Further, since the benefits of the antenna diversity techniques manifest at relatively low Doppler frequencies. Accordingly, in preferred embodiments, a suitable threshold for the Doppler frequency is approximately 50 Hz If block 401 determines the appropriate thresholds are met, the routine passes to block 402. Otherwise, the routine remains at block 401 until the necessary conditions exist.

In block 402, the signal quality of the current antenna is determined, as discussed above, preferably by assessing the power output from the ACI filter or other signal metrics or a combination. Also preferably, the signal quality is determined at each OFDM symbol, since there is no discontinuity associated with determining the power of the current antenna so there is relatively little overhead. Block 403 determines if the signal quality of the current antenna remains below a desired threshold for a given period of time and if so, passes the routine to block 404. Otherwise, the routine restarts by returning to block 401.

Block 404 represents the antenna test, in which the signal quality of an alternate antenna is determined by temporarily switching the antenna feed for a period within the GI of an OFDM symbol, as described above. During the test, block

405 sends a gating signal to the relevant pre-FFT processes to help minimize the effects of the signal discontinuity caused by switching the antenna.

Next, block 406 determines whether the signal quality of the alternate antenna is greater than the current antenna for a suitable threshold For example a threshold in the range of approximately 2 to 3 dB compensates for the signal loss discussed above associated with switching from a two dimensional filter to a one dimensional filter. If block 406 determines the alternate antenna has better signal quality, the routine passes to block 407, otherwise the routine returns to block 401.

Block 407 represents the antenna change, in which the antenna feed is switched from the current antenna to the alternate antenna, causing the alternate antenna to become the new antenna. The switching process occurs during the GI of a subsequent OFDM As indicated by block 408, a gating signal is sent to the relevant pie- and post-FFT processes during the antenna change. Typically, when the antenna switch occurs, then receiver employs the one dimensional filter for a transition period until sufficient OFDM symbols have been received to permit use of the two dimensional filter. Depending upon the size of the two dimensional filter, this period is approximately 16 OFDM symbols.

Alternatively, if the signal quality determination for the antennas can be completed rapidly, the receiver can be configured to switch to the best antenna within the same guard interval in which the measurements are performed as discussed above. Accordingly, the best antenna will to be used for each OFDM symbol, as soon as it is discovered.

As one of skill in the art will appreciate, there are situations in which determining the quality of the signal on each antenna can be difficult to obtain. Thus, in one aspect, the antenna switch may not be driven by a determination of antenna quality. Accordingly, the receiver can be configured to perform a "blind" switch between the antennas. In one example, the antenna being used is alternated on each successive signal As discussed above, the switch occurs during the GI to avoid data loss This strategy can provide improved performance in difficult signal conditions Finally, in block 409 the feed from the new antenna is maintained for a desired time before returning the routine to block 401 so that a fresh comparison between antennas can be made if conditions warrant. As discussed above, the antenna switch affects some pre-FFT and post-FFT processes and, accordingly, potentially interferes with tracking information such as Doppler estimation, frequency offset estimation and the like. Thus, the receiver can be configured to minimize these disruptions by providing a minimum hold time before triggering a signal comparison and possible antenna switch. In one example, a preferred hold time is approximately 16 OFDM symbols.

By employing the techniques disclosed in this specification, significant performance gains can be achieved, particularly at lower Doppler frequencies. In one simulation, two systems were compared, one of which employed an antenna diversity technique as disclosed herein. The simulation employed a one-segment ISDB-T MODE 3 protocol, using quadrature phase shift keying (QPSK), 2/3 error coding, a 1/8 GI and TI=4 Both channels for antenna 1 and 2 are independent and the signal for antenna 2 had a 1 μs relative delay. The estimated duration was approximately 120 seconds and the required received signal strength indication (RSSI) was determined at Doppler frequencies of 0 25, 1, 5, 10, 20, 50 and 100 Hz.

Figure 5:
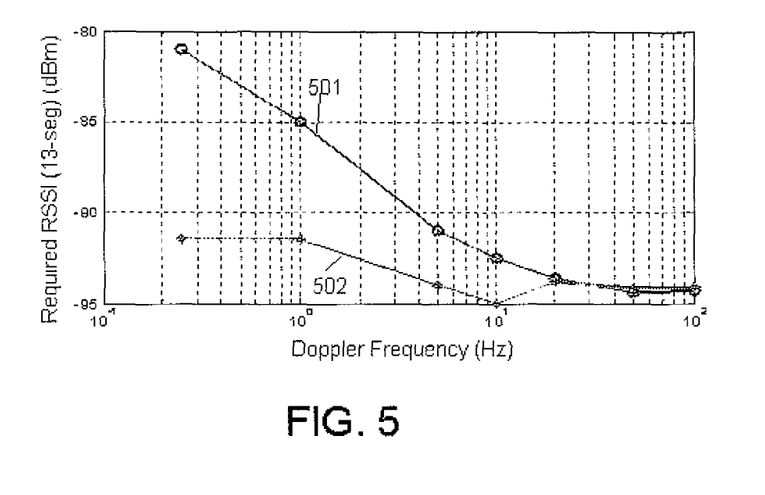
FIGS. 5-8 are graphs plotting the required received signal strength indicators at varying Doppler frequencies for antenna diversity systems compared to systems without antenna diversity.
Figure 6:
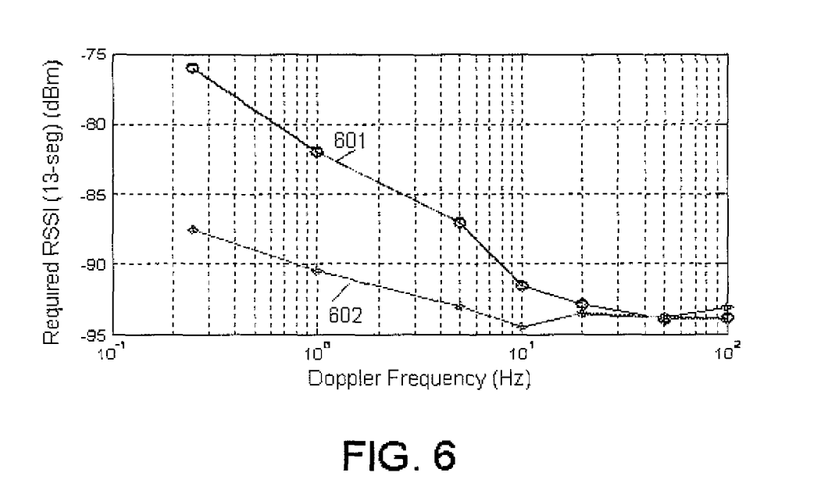

FIGS. 5 and 6 show the results using the Pure-Rayleigh channel profile. The required RSSI to provide a 1% packet error rate is shown in FIG. 5 and the required RSSI to provide a 0.1% packet error rate is shown in FIG. 6 In FIG. 5, plot 501 with open circles indicates the non-antenna diversity implementation and plot 502 with closed diamonds indicates the antenna diversity implementation. Similarly, in FIG. 6, plot 601 with open circles indicates the non-antenna diversity implementation and plot 602 with closed diamonds indicates the antenna diversity implementation. As can be seen, the antenna diversity implementation exhibited increasing performance advantages at Doppler frequencies below 50 Hz.

Figure 7:
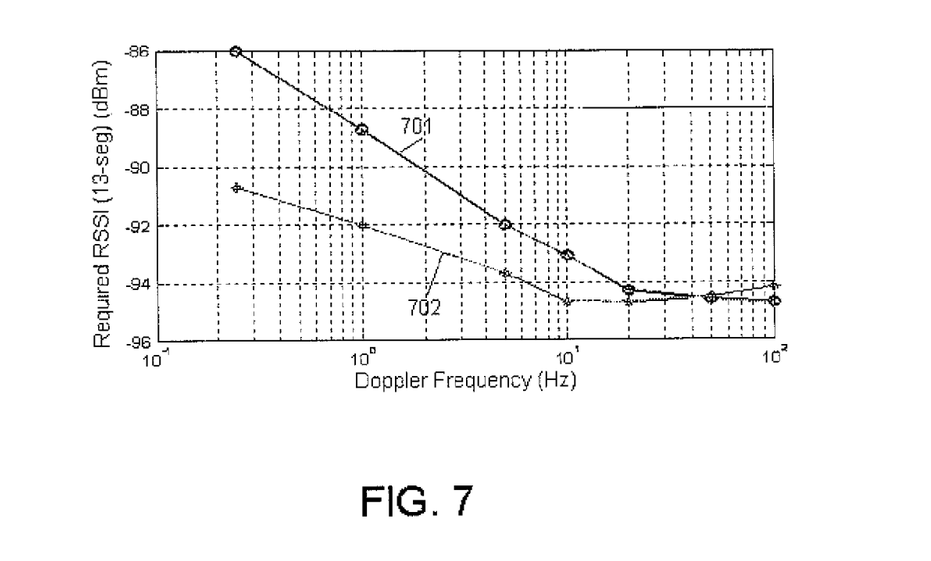
Figure 8:
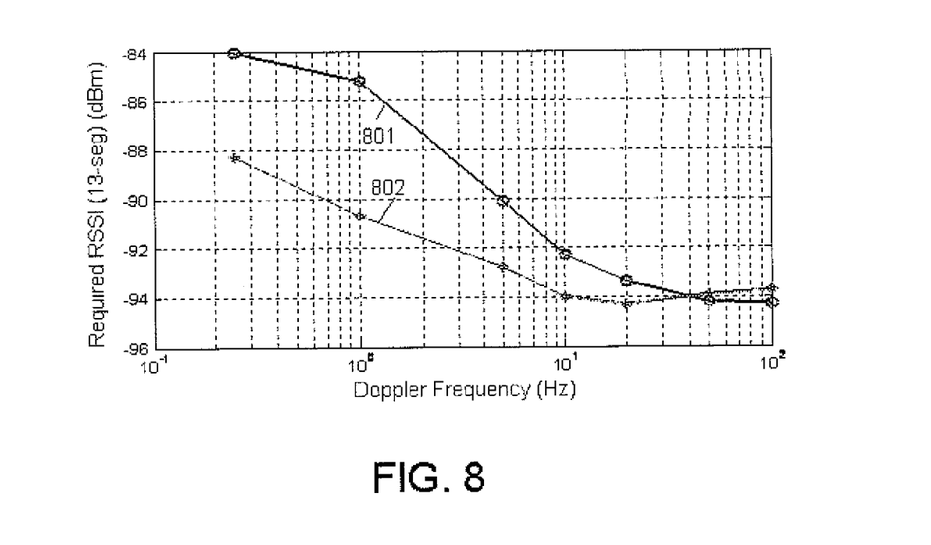

FIGS. 7 and 8 show the results using the typical urban 6 (Tu-6) channel profile. The required RSSI to provide a 1% packet error rate is shown in FIG. 7 and the required RSSI to provide a 0.1% packet error late is shown in FIG. 8 In FIG. 7, plot 701 with open circles indicates the non-antenna diversity implementation and plot 702 with closed diamonds indicates the antenna diversity implementation. Similarly, in FIG. 8, plot 801 with open circles indicates the non-antenna diversity implementation and plot 802 with closed diamonds indicates the antenna diversity implementation. As can be seen, this channel profile also results in the antenna diversity implementation exhibiting increasing performance advantages at Doppler frequencies below approximately 50 Hz.

Figure 9:
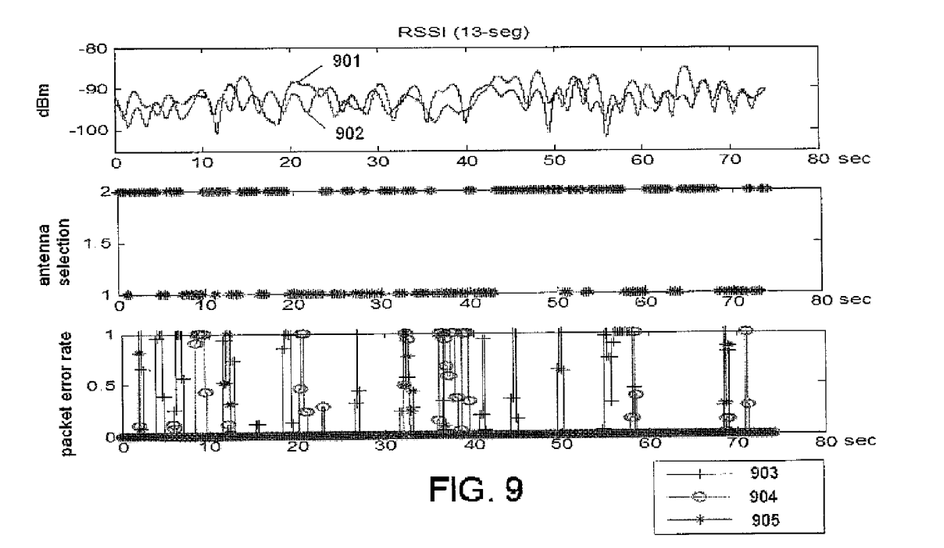
FIGS. 9-10 are graphs showing the correlation of received signal strength of two antennas with the packet error rate at two Doppler frequencies.
Figure 10:
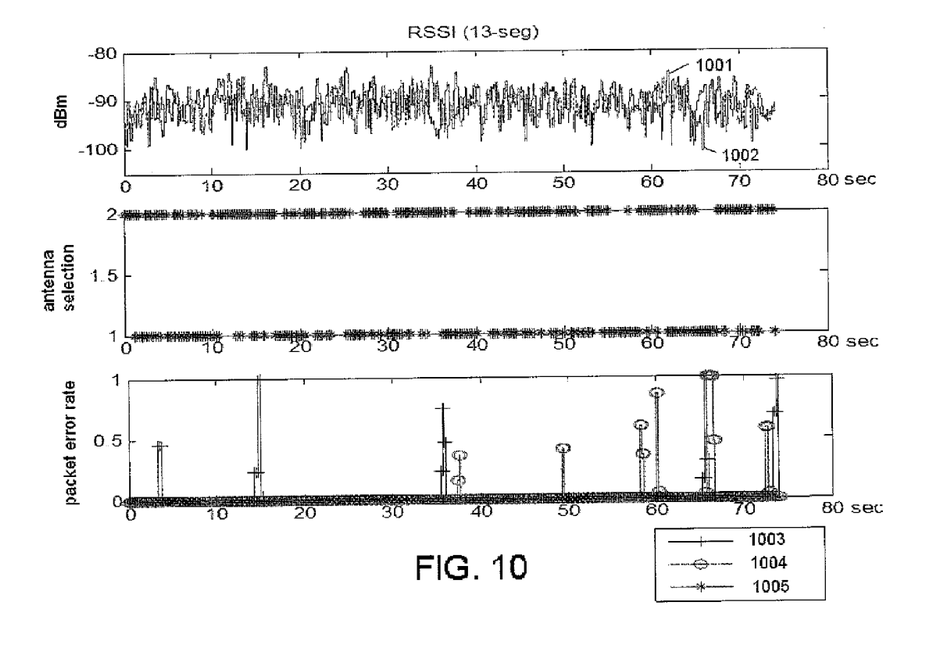

Additional simulation data comparing the performance of antenna diversity to non-antenna diversity systems is shown in FIGS. 9 and 10. In these simulations, the Tu-6 channel profile was used and the estimated duration was approximately 70 sec. FIG. 9 shows the results at a Doppler frequency of 1 Hz and FIG. 10 shows the results at a Doppler frequency of 0.25 Hz. In FIG. 9, the top graph shows the RSSI for antenna 1 in plot 901 and antenna 2 in plot 902. The middle graph shows which antenna was selected in the antenna diversity system on the basis of the signal strength shown above. The bottom graph shows the packet error rates for antenna 1 in plot 903 with hash marks, for antenna 2 in plot 904 with open circles and for the antenna diversity system in plot 905 with asterisks. From this data, it has been determined that the averaged packet error rate for antenna 1 was 14.77%, for antenna 2 was 8.07% and for the antenna diversity system was 3.35%. Next, in FIG. 10, the top graph shows the RSSI for antenna 1 in plot 1001 and antenna 2 in plot 1002. The middle graph shows which antenna was selected in the antenna diversity system on the basis of the signal strength shown above. The bottom graph shows the packet error rates for antenna 1 in plot 1003 with hash marks, for antenna 2 in plot 1004 with open circles and for the antenna diversity system in plot 1005 with asterisks. From this data, it has been determined that the averaged packet error rate for antenna 1 was 2.33%, for antenna 2 was 2.20% and for the antenna diversity system was 0%. Accordingly, the use of antenna diversity using the techniques in this specification provides significant performance improvements, particularly at lowering Doppler frequencies.

It should be noted that the exemplary embodiments shown above contain a number of computational blocks that may be shared or distributed depending upon the desired implementation For example, the number of memory blocks distributed throughout a design may differ and additional memory blocks can be used Similarly calculation blocks, such as the interpolation filters or the equalizers can be shared or distributed as desired. Also one or more phase change estimation or ICI reduction blocks may be configured to perform the iterative calculations sequentially. A variety of similar implementations should be considered equivalent to the phase glitch reducing systems described above.

Described herein are presently preferred embodiments, however, one skilled in the art that pertains to the present invention will understand that the principles of this disclosure can be extended easily with appropriate modifications to other applications. For example, examples have been given regarding use with the mobile television standards ISDB-T and DVB-H, although the principles can be applied to a wide range of OFDM wireless communication standards, including other mobile television standards, including I-DMB, CMMB(STiMi) and MediaFLO forward link, as well as other digital television standards, including DVB-T, digital radio standards, including DAB/EUREKA 147, DAB+, Digital Radio Mondiale, HD Radio, T-DMB and ISDB-TSB, wireless LAN radio interfaces, including IEEE 802.11a, g, n and HIPERLAN/2, cellular communication systems, including Flash-OFDM, mobile and wireless broadband systems, including HSOPA, BWA, WiMAX, Mobile WiMax, and WiBro, and other wideband systems, including UWB. Furthermore, the phase glitch estimation and removal can be applied to other multiple sub-carrier wireless systems, including CDMA, GSM, IS-856, EV-DO, SDMA and the like. Further, the primary embodiments discussed have employed two antennas, however, the systems and methods can be extended to utilize a greater number of antennas. As such, changes and modifications are properly, equitably, and intended to be, within the full range of equivalence of the following claims.

What is claimed is:

1. A method for providing antenna diversity in a multiple sub-carrier digital communication receiver comprising:
   providing a first antenna and a second antenna, wherein the first antenna is delivering a signal feed to the receiver and the second antenna is not delivering the signal feed to the receiver;
   estimating a Doppler frequency associated with the signal feed; and
   switching the signal feed being delivered to the receiver from the first antenna to the second antenna during a first guard interval directly in response to determining that the Doppler frequency is below a threshold such that the second antenna is delivering the signal feed to the receiver and the first antenna is not delivering the signal feed to the receiver.

2. The method of claim 1, further comprising alternating between the first antenna and second antenna during subsequent guard intervals.

3. The method of claim 1, further comprising:
   determining a metric of the first antenna;
   determining a metric of the second antenna upon switching the signal feed being delivered to the receiver from the first antenna to the second antenna during the first guard interval; and
   selecting between the first antenna and the second antenna on the basis of the determined metrics.

4. The method of claim 3, wherein selecting between the first antenna and the second antenna comprises switching the signal feed to the second antenna for a period of at least one symbol when the metric of the second antenna is preferred to the metric of the first antenna.

5. The method of claim 3, wherein selecting between the first antenna and the second antenna comprises switching the signal feed during a guard interval back to the first antenna from the second antenna when the metric of the first antenna is preferred to the metric of the second antenna.

6. The method of claim 5, wherein the signal feed is switched back to the first antenna during the first guard interval.

7. The method of claim 3, wherein determining the metric of the second antenna comprises switching the signal feed being delivered to the receiver from the first antenna to the second antenna and then back to the first antenna during a first guard interval and wherein the step of selecting between the first antenna and the second antenna on the basis of the determined metrics comprises switching the signal feed from the first antenna to the second antenna at a subsequent guard interval when the metric of the second antenna is preferred to the metric of the first antenna.

8. The method of claim 3, wherein determining antenna metrics comprise measuring at least one signal quality metric selected from the group comprising power output, interference power in an adjacent channel, received signal, and flatness of received channel.

9. The method of claim 8, wherein the signal quality metric is power output.

10. The method of claim 1, further comprising modifying a pre-FFT process when the signal feed being delivered to the receiver is switched from the first antenna to the second antenna during the first guard interval.

11. The method of claim 7, further comprising modifying a pre-FFT process when the signal feed being delivered to the receiver is switched from the first antenna to the second antenna during the first guard interval and modifying a pre-FFT process and a post-FFT process when the signal feed being delivered to the receiver is switched from the first antenna to the second antenna during the subsequent guard interval.

12. An apparatus for providing antenna diversity in a multiple sub-carrier wireless communication system, comprising:
   a first antenna and a second antenna;
   a Doppler estimation module configured to determine a Doppler frequency; and
   a switching module configured to switch a signal feed being delivered to the receiver during a first guard interval directly in response to determining that the Doppler frequency is below a threshold from a first configuration wherein the first antenna delivers the signal feed to the receiver and the second antenna does not deliver the signal feed to the receiver to a second configuration wherein the second antenna delivers the signal feed to the receiver and the first antenna does not deliver the signal feed to the receiver.

13. The apparatus of claim 12, wherein the switching module is further configured to alternate between the first antenna and second antenna during subsequent guard intervals.

14. The apparatus of claim 12, further comprising:
   an antenna metric module configured to determine a metric of the first antenna and to determine a metric of the second antenna after the signal feed being delivered to the receiver from the first antenna is switched to the second antenna during the first guard interval; and
   wherein the switching module is further configured to select between the first antenna and the second antenna on the basis of the determined metrics.

15. The apparatus of claim 14, wherein the switching module is configured to select between the first antenna and the second antenna by leaving the signal feed switched to the second antenna for a period of at least one symbol when the metric of the second antenna is preferred to the metric of the first antenna.

16. The apparatus of claim 14, wherein switching module is configured to select between the first antenna and the second antenna by switching the signal feed during a guard interval back to the first antenna from the second antenna when the metric of the first antenna is preferred to the metric of the second antenna.

17. The apparatus of claim 16, wherein the signal feed is switched back to the first antenna during the first guard interval.

18. The apparatus of claim 14, wherein the antenna metric module is configured to determine the metric of the second antenna when the signal feed being delivered to the receiver is switched from the first antenna to the second antenna and then back to the first antenna during a first guard interval and wherein the switching module is configured to select between the first antenna and the second antenna by switching the signal feed from the first antenna to the second antenna at a subsequent guard interval when the metric of the second antenna is preferred to the metric of the first antenna.

19. The apparatus of claim 14, wherein the antenna metric module is configured to measure at least one signal quality metric selected from the group comprising power output, interference power in an adjacent channel, received signal, and flatness of received channel.

20. The apparatus of claim 19, wherein the signal quality metric is power output.

21. The apparatus of claim 12, further comprising a pre-FFT process module configured to modify a pre-FFT process when the signal feed being delivered to the receiver is switched from the first antenna to the second antenna during the first guard interval.

22. The apparatus of claim 18, further comprising a pre-FFT process module and a post-FFT process module, wherein the pre-FFT process module is configured to modify a pre-FFT process when the signal feed being delivered to the receiver is switched from the first antenna to the second antenna during the first guard interval and wherein the pre-FFT process module is configured to modify a pre-FFT process and the post-FFT module is configured to modify a post-FFT process when the signal feed being delivered to the receiver is switched from the first antenna to the second antenna during the subsequent guard interval.

* * * * *